(12) United States Patent
Ito

(10) Patent No.: US 6,196,626 B1
(45) Date of Patent: Mar. 6, 2001

(54) VEHICLE SUNSHADE DEVICE

(75) Inventor: Nobuo Ito, Kanagawa (JP)

(73) Assignee: Ohi Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 09/333,025

(22) Filed: Jun. 15, 1999

(30) Foreign Application Priority Data

Jun. 15, 1998 (JP) .................................................. 10-167238

(51) Int. Cl.⁷ .......................................................... B60J 7/00
(52) U.S. Cl. ............................................. 296/214; 160/227
(58) Field of Search ..................... 296/214; 160/226–228

(56) References Cited

U.S. PATENT DOCUMENTS

| | | | |
|---|---|---|---|
| 4,852,938 | * | 8/1989 | Hirshberg et al. .................... 296/214 |
| 6,056,352 | * | 5/2000 | Ewing et al. .......................... 296/214 |

FOREIGN PATENT DOCUMENTS

3223136 * 3/1983 (DE) ..................................... 296/214

* cited by examiner

Primary Examiner—Dennis H. Pedder
(74) Attorney, Agent, or Firm—Foley & Lardner

(57) ABSTRACT

A pushing projection having a portion for abutment at a front end thereof and a pulling-in projection having a portion for engagement at a rear portion thereof are provided on an upper surface of a front end portion of a rear sunshade so as to protrude therefrom. And at a rear end portion of a front sunshade, there are provided a pushing portion to be brought into abutment with the portion for abutment of the pushing projection so as to push rearward the front end portion of the rear sunshade and a hook portion being oriented downwardly, when the front sunshade is moved rearward and a hook member having at a rear end portion. Further, there is provided a hook member to be brought into engagement with the portion for engagement of the pulling-in projection so as to pull out forwardly and upwardly the front end portion of the rear sunshade when the front sunshade is moved forwardly.

3 Claims, 8 Drawing Sheets

VEHICLE SUNSHADE DEVICE

BACKGROUND OF THE INVENTION

1. Field of the Invention

The present invention relates to a vehicle sunshade device in which an opening formed in a roof of a vehicle is opened and/or closed by two front and rear sunshades.

The present application is based on Japanese Patent Application No. Hei. 10-167238, which is incorporated herein by reference.

2. Description of the Related Art

A certain sunroof device fitted on a roof of a vehicle has a sunshade device provided under a sunroof lid for opening and/or closing an opening formed in the roof of the vehicle which comprises two front and rear sunshades for shielding a passenger compartment of the vehicle from sunlight.

In a sunshade device of this type, when the opening is closed, the front and rear sunshades are disposed substantially on the same horizontal plane with a rear end of the front sunshade and a front end of the rear sunshade abutting with each other, and when the front sunshade is slid rearward from the above state, the rear sunshade is pushed rearward, and after the rear sunshade is stored in a storing portion formed in a lower portion of the roof, the abutment relationship between the front and rear sunshades is released. Thereafter only the front sunshade is moved alone further rearward, and in a fully opened state, the front sunshade and rear sunshade are stored in the storing portion with the former being stacked above the latter in a one-on-the-other fashion (refer, for instance, Japanese Utility Model Publication No. Hei. 5-60919).

Since a conventional sunshade device as described above is, however, constructed such that a rear end portion of a front sunshade abuts with a front end portion of a rear sunshade so as to move the rear sunshade rearward together therewith when the front sunshade is opened, there is caused a drawback that skin materials are liable to be damaged when rubbed with each other, and in addition, since a vertical abutment width of an abutment portion between the rear end portion of the front sunshade and the front end portion of the rear sunshade is not sufficient, there is also caused a drawback that the rear end portion of the front sunshade and the front end portion of the rear sunshade are disengaged from each other in vertical directions, this facilitating the occurrence of malfunctions.

SUMMARY OF THE INVENTION

The present invention was made in view of the above problems, and an object thereof is to provide a vehicle sunshade device that can eliminate rubbing of the skin materials of the sunshades with each other and prevent a malfunction when the sunshades are opened or closed, whereby a smooth operation of the sunshade device can be attained.

According to the present invention, there is provided a vehicle sunshade device comprising: a front sunshade and a rear sunshade arranged one after the other in a longitudinal direction for opening and closing an opening formed in a roof of a vehicle, the front and rear sunshades being guided between a fully closed position where the front and rear sunshades are arranged to align with each other in a longitudinal direction to thereby close the opening and a fully closed position where the front and rear sunshades are positioned below and rearward of the opening with the front sunshade being stacked above the read sunshade; and a link mechanism provided at a rear end of the front sunshade and a front end of the rear sunshade for pushing the front end of the rear sunshade until the rear sunshade reaches the fully opened position when the front sunshade is moved rearward and for pulling out the front end of the rear sunshade until the rear sunshade reaches the fully closed position when the front sunshade is moved forward. The link mechanism comprises rear side link means and front side link means. The rear side link means comprises: a pushing projection provided on an upper surface of a front end portion of a rear sunshade so as to protrude therefrom and having a portion for abutment at an front end thereof; and a pulling-out projection provided on the upper surface of the front end portion of the rear sunshade so as to protrude therefrom and having a portion for engagement at a rear portion thereof. The front side link comprises: a pushing portion provided at the rear end of the front sunshade and adapted to be brought into abutment with the portion for abutment of the pushing projection so as to push the front end portion of the rear sunshade rearward when the front sunshade is moved rearward and to be separated upwardly away from the portion for abutment so as to be moved alone rearward after the rear sunshade has reached a fully opened position; and a hook member provided having at a rear end thereof a hook portion oriented downwardly and adapted to be brought into engagement with the portion for abutment of the pulling-out projection so as to pull out the front end portion of the rear sunshade forwardly and upwardly when the front sunshade is moved forwardly.

The front side link preferably comprises a supporting piece secured to the rear end of the front sunshade, and the hook member is pivotally secured to the supporting piece with a shaft oriented transversely and is biased so as to be oriented downwardly.

The pushing portion can made integral with the hook member, and a line connecting a point of contact between the pushing portion and the portion of abutment and a rotating center of the hook member is constructed so as to be oriented substantially in the same direction as that in which the rear sunshade is moved.

Features and advantages of the invention will be evident from the following detailed description of the preferred embodiments described in conjunction with the attached drawings.

DETAILED DESCRIPTION OF THE PREFERRED EMBODIMENTS

The accompanying drawings FIGS. 1 to 7 show a first embodiment of the present invention.

Figure 1:
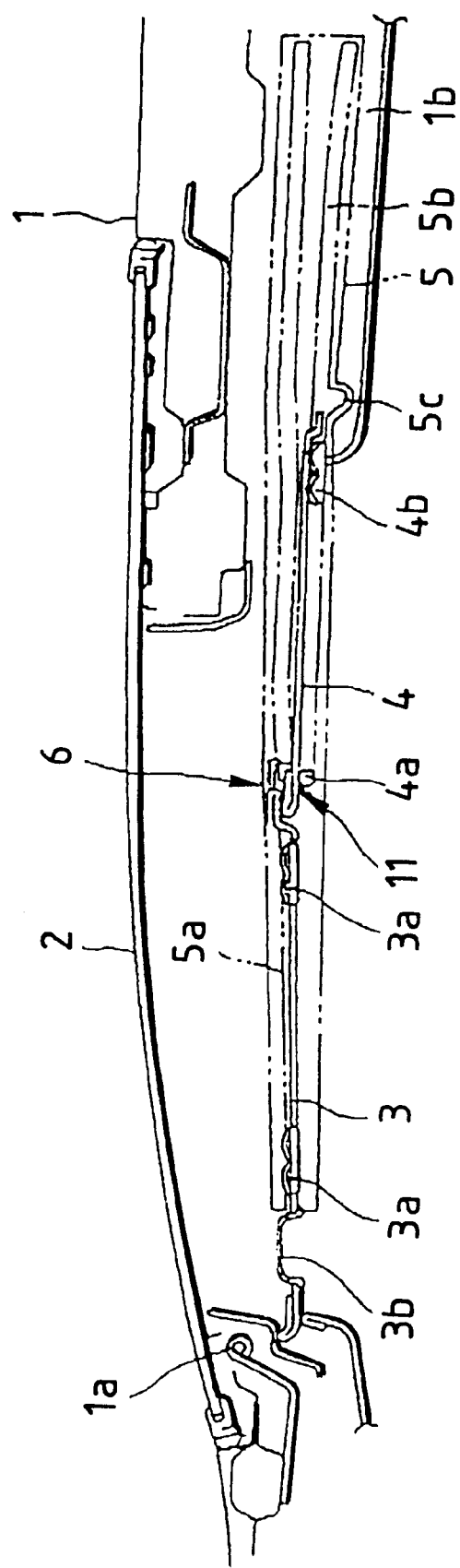
FIG. 1 is a longitudinal side view of a roof showing a state in which the sunshade is closed halfway according to a first embodiment of the present invention.

In FIG. 1, reference numeral 1 denotes a roof of a vehicle and reference numeral 2 a light-transmissive sunroof lid of glass or the like pivotably supported on a front edge portion of an opening formed in the roof at a front end thereof by a hinge 1a and adapted to be lifted and lowered in vertical directions at a rear end thereof. A front sunshade 3 and a rear sunshade 4, which are arranged one after the other in a longitudinal direction, are mounted under the sunroof lid 2 in such a manner as to slide in longitudinal directions on longitudinally oriented guide rails 5 provided on both sides of the opening and a storing portion 1b, which will be described later.

Figure 4:
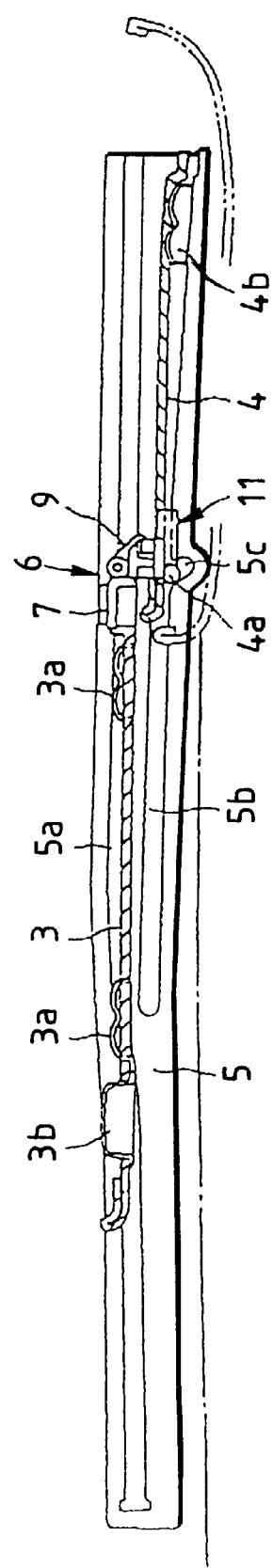
FIG. 4 is an enlarged longitudinal side view showing a state in which the front sunshade is opened substantial halfway.

The front and rear sunshades 3, 4 can move between a fully closed position where they align with each other in a longitudinal direction under the sunroof lid 2 with a rear end of the front sunshade 3 abutting against a front end of the rear sunshade 4 to thereby close the opening and, as shown in FIG. 4, a fully opened position where they are stopped in the storing portion 1b formed under a portion of the roof 1 that is rearward of the opening in such a manner as to be vertically stacked one on the other.

Figure 2:
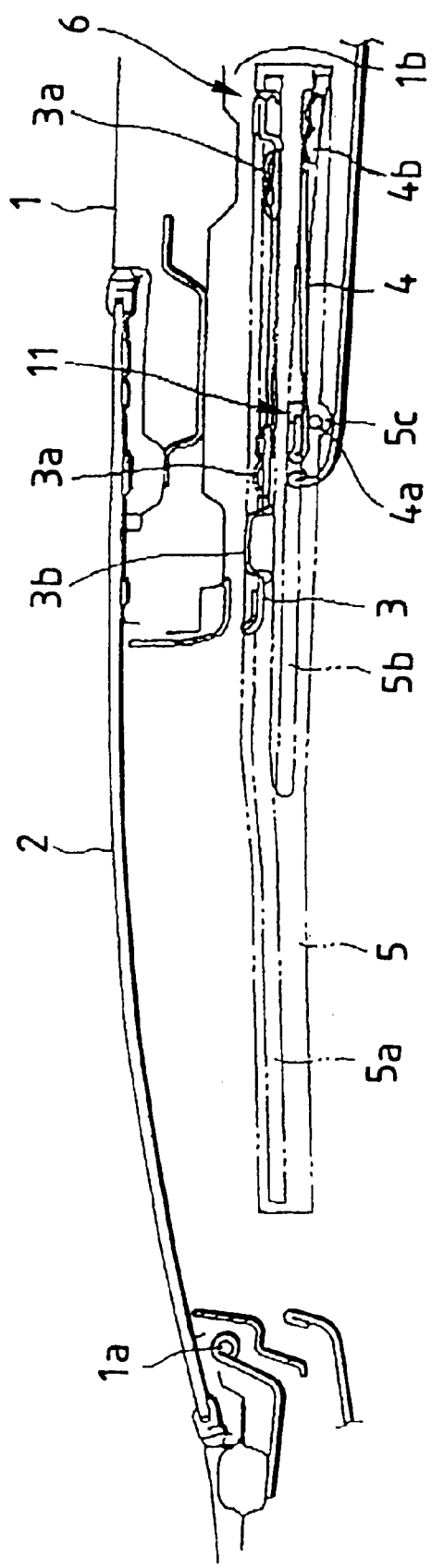
FIG. 2 is a longitudinal side view of a roof showing a state in which the sunshade are fully opened.
Figure 3:
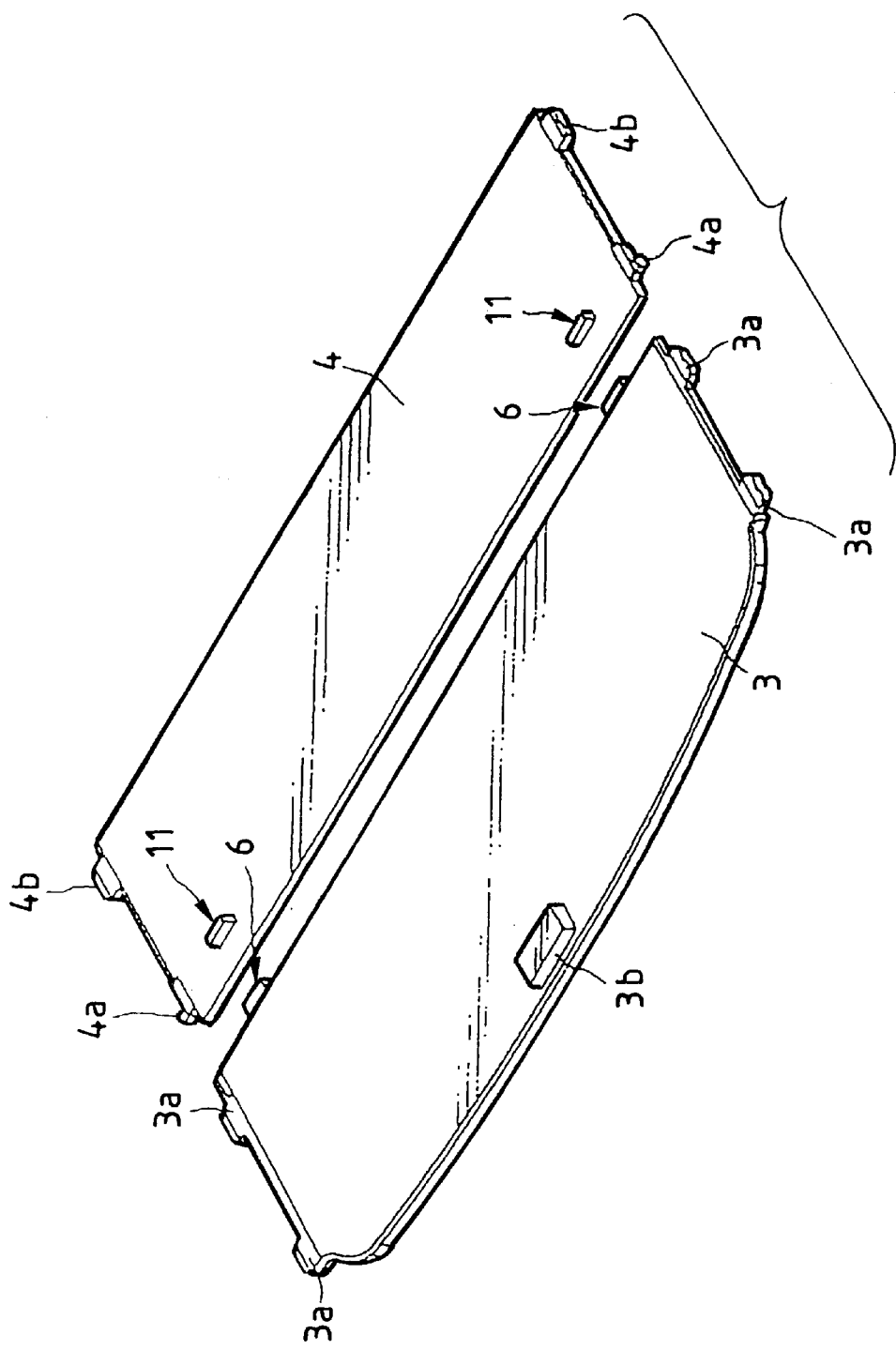
FIG. 3 is a perspective view showing the front and rear sunshades.

As shown in FIGS. 1, 2 and 4, formed in each guide rail 5 are two grooves; a first guide groove 5a extending from near a front end adjacent to a rear end thereof to slidably support the front sunshade 3 from its fully closed position to its fully opened position and a second guide groove 5b extending under the front guide groove 5a from a position near a center of the opening to near the rear end of the guide rail 5 to slidably support the rear sunshade 4 from its fully closed position to its fully opened position. A drop-in portion 5c which is recessed toward the rear is formed in a lower portion of the second guide groove 5b at a longitudinal position near a center thereof.

Elastically deformable sliders 3a are provided on side portions of a front sunshade 3 at front and rear portions thereof so that they can slidably fit in first guide grooves 5a of guide rails 5, and an upwardly recessed operating portion 3b is formed in a bottom surface of the front sunshade at a front central portion thereof. Provided on side portions of a rear sunshade 4 at front and rear portions thereof, respectively, are pin-like sliders 4a adapted to slidably fit in second guide grooves 5b and further drop in drop-in portions 5c and elastically deformable sliders 4b adapted to slidably fit in the guide grooves 5b.

Reference numeral 6 denotes a pair of left and right front side link means provided at the rear end portion of the front sunshade 3, and reference numeral 11 denotes a pair of left and right rear side link means, and a link mechanism is constituted by these front side and rear side link means such that when the front shade 3 is moved rearward, the front end portion of the rear sunshade 4 is pushed rearward by the front sunshade 3 until it reaches to a fully opened position, while when the front sunshade 3 is moved forward, the front end of the rear sunshade 4 is pulled out by the front sunshade until it reaches a fully closed position.

Figure 5:
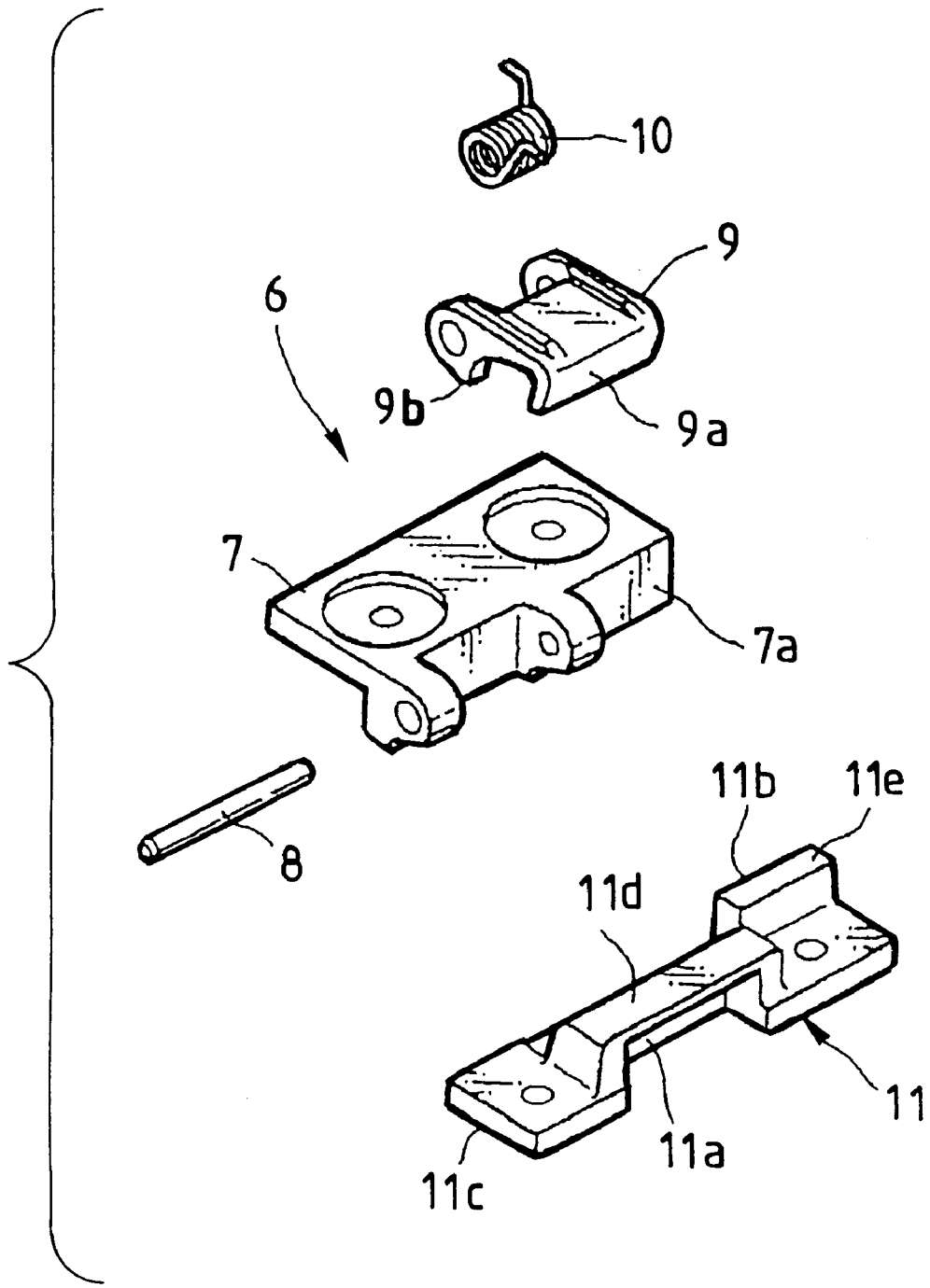
FIG. 5 is an exploded perspective view of the link mechanism.
Figure 6:
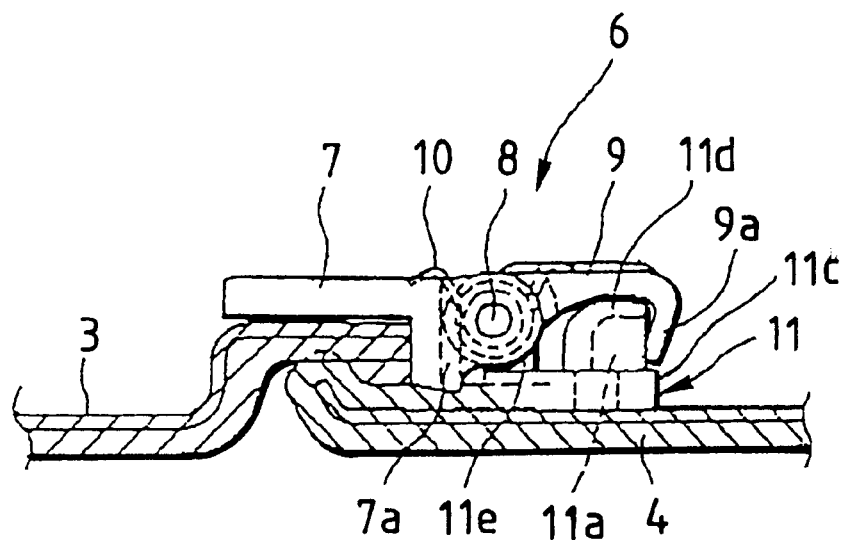
FIG. 6 is an enlarged side view of the link mechanism when the sunshades are fully closed.
Figure 7:
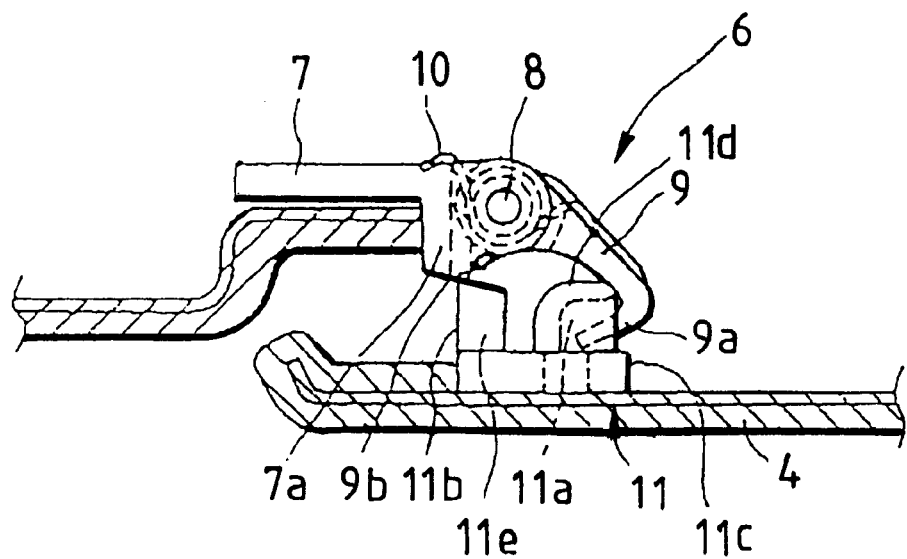
FIG. 7 is an enlarged side view of the link mechanism when the sunshades are opened halfway.
Figure 8:
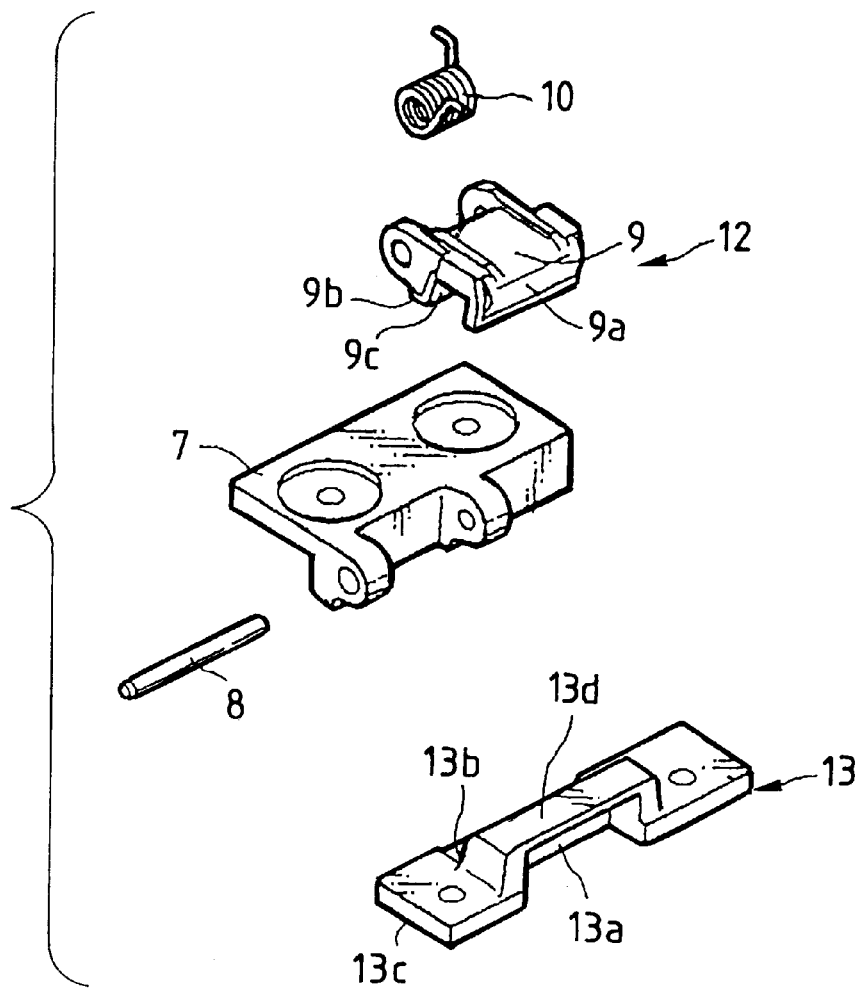
FIG. 8 is an exploded perspective view of a second embodiment of the present invention.
Figure 9:
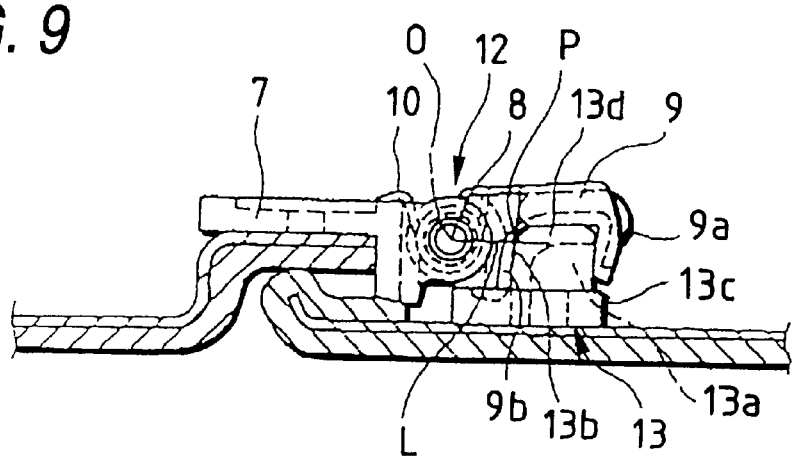
FIG. 9 is an enlarged side view of the link mechanism when the sunshades are fully closed.
Figure 10:
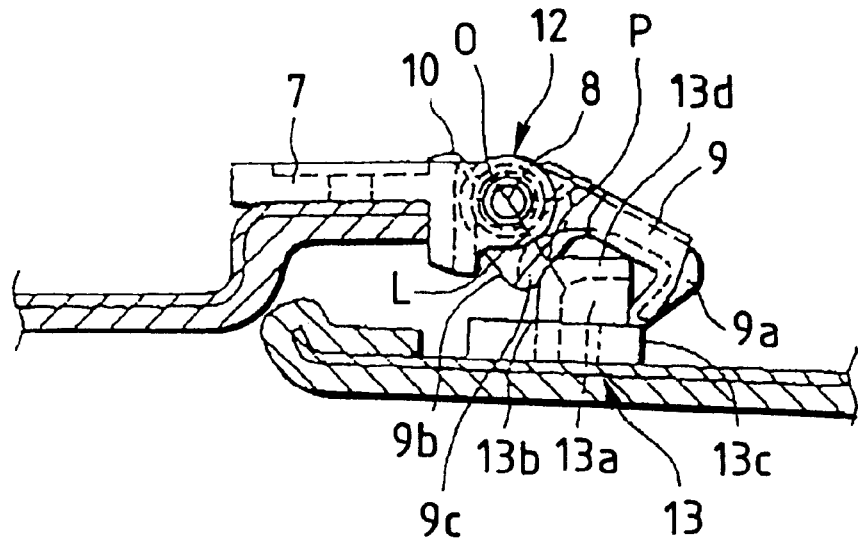
FIG. 10 is an enlarged side view of the link mechanism when the sunshades are opened halfway.
Figure 11:
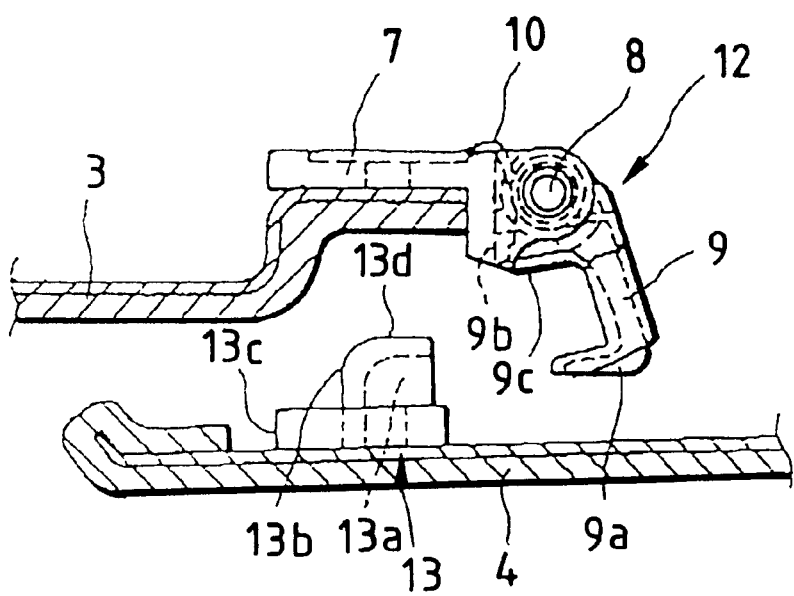
FIG. 11 is an enlarged side view of the link mechanism when the sunshades are further pushed rearward from the halfway-opened position.

As shown in FIGS. 5 to 7, the rear side link means 11 comprises a pulling-out projection lid provided on one side portion of a supporting piece 11c secured to an upper surface of the front end portion of the rear sunshade 4 in such a manner as to protrude therefrom and having formed in a rear end face thereof a forwardly oriented recessed groove-like portion 11a for abutment, and a pushing projection 11e provided on the other side portion of the supporting piece 11c in such a manner as to protrude therefrom and made as a portion 11b for abutment at a front end surface thereof.

The front side link means 6 comprises a pushing portion 7a formed by one side portion of a suspending piece suspending from a rear end portion of a supporting piece 7 secured to an upper surface of a rear end portion of an upwardly oriented stepped rear end portion of the front sunshade 3 and a hook member 9 secured pivotally to the other side portion of the suspending piece at the rear end portion of the supporting piece 7 with a shaft 8 oriented transversely and having at a rear end thereof a hook portion 9 oriented downwardly.

The pushing portion 7a has such a sufficient width in vertical directions that the pushing portion 7a is brought into abutment with the portion for abutment 11b of the pushing projection 11e so as to push the front end portion of the rear sunshade rearward when the front sunshade 3 is moved rearward, and that after the rear sunshade 4 reaches the fully opened position, the pushing portion 7a is separated upwardly away from the portion 11b for abutment so as to be moved alone rearward.

The hook member 9 is brought into engagement with the portion 11a for engagement of the pulling-out projection 11d so as to act to pull out forwardly upwardly the front end portion of the rear sunshade 4 when the front sunshade 3 is moved forward.

A spring 10 is provided around the shaft 8 so as to biass the hook member 9 downwardly. A stopper 9b is provided on the hook member 9 below the shaft 8 adapted to be brought into abutment with the rear end surface of the suspending piece of the supporting piece 7 to thereby prevent the hook portion 9a from further rotating downwardly rearward when the hook portion 9a reaches a predetermined downwardly rearward inclined position.

In the fully closed state shown in FIG. 1, the front sunshade 3 and the rear sunshade 4 are arranged longitudinally one after the other on a substantially horizontal surface without any difference in level with the rear end of the former and the front end of the latter abutting with each other, whereby an opening is closed. In addition, as shown in FIG. 6, the hook member 9 of the front side link means 6 is in engagement with an upper end of the pulling-out projection 11d at the rear end thereof, and biasses the front portion of the rear sunshade 4 downwardly by virtue of the biassing force of the spring 10.

When the front sunshade 3 is pushed by the operating portion 3a rearward from this fully closed, the pushing portion 7a of the front side link means 6 is moved rearward (rightward as viewed in FIG. 6) and is brought into abutment with the portion 11b for abutment of the rear side link means 6, whereby both the front sunshade and the rear sunshade are caused slide rearward together.

As shown in FIG. 4, when the rear sunshade 4 is stored in a storing portion 1b, the front pin-like sliders 4a are pressed downwardly by the hook members 9 so as to be dropped in the drop-in portions 5c, whereby the front end portion of the rear sunshade 4 is, as shown in FIG. 7, displaced downwardly, this disengaging the pushing portion 7a upwardly from the upper end of the portion 11b for abutment.

When the front sunshade 3 is caused to further slide rearward, with the rear sunshade 4 being stopped at the fully opened position, the front sunshade 3 is guided alone along the first guide grooves 5a so as to slide above the rear sunshade 4 to produce a fully opened state as shown in FIG. 2.

In the fully opened state, the front sunshade 3 and the rear sunshade 4 are stacked one on the other in a vertical direction and are stored in the storing portion 1b. At this moment, the stoppers 9b are brought into abutment with the rear end surfaces of the suspending pieces of the supporting pieces 7, and the hook members 9 stop at a lower limit position where the hook portion 9a is oriented downwardly rearward.

When the operating portion 3b is hooked by the finger and pulled forward, the front sunshade 3 is pulled forward from the fully opened state, and when it is pulled out halfway, the hook portions 9a of the hook members 9 are brought into engagement with the portions 11a for engagement of the rear side link means 11, and thereafter the sliders 4a being pulled up from the drop-in portions 5c, the sliders 4a are pulled out of the storing portion 1b together with the front sunshade 3.

With the front sunshade 3 being caused to slide forward furthermore, the front sunshade 3 continues to slide while being guided by the first guide grooves 5a so as to be displaced downwardly, and the rear end portion of the front sunshade 3 and the front end portion of the rear sunshade 4 become continuous with each other on the substantially same horizontal plane to reproduce the fully closed state.

FIGS. 8 to 11 show a second embodiment of the present invention.

In this embodiment, a single projection 13d is provided on a supporting piece 13c secured to an upper surface of the front end portion of a rear sunshade 4 in such a manner as to protrude therefrom, and a forwardly oriented recessed groove-like portion 13a for engagement is formed in a rear end surface thereof, while a front end surface of the projection 13d is made to be a portion 13b for abutment, this forming a rear side link means 13. In addition, a plate member is secured to a rear face of a stopper 9a of a hook member 9 which are respectively like those used in the first embodiment, and a front side link means 12 is formed by constituting a rear surface of the plate member as a pushing portion 9c for push moving the portion 13b for abutment rearward.

Thus, it is constructed by orienting a line L connecting a point of contact P between the pushing portion 9c and the portion 13b for abutment to a rotating center O of the hook member 9 in the substantially same direction in which the rear sunshade 4 is moved such that no force is applied to the rear sunshade 4 other than that applied in the direction in which the rear sunshade is moved.

The remaining constructions of the second embodiment are identical to those in the first embodiment, and therefore detailed descriptions thereof will be omitted.

In the second embodiment, in addition to effectiveness similar to that provided by the first embodiment, there are provided advantages that the front side link means 12 and the rear side link means 13 can be constructed simpler than those in the first embodiment so as to reduce the production costs, and moreover that the rear sunshade 4 can be moved more smoothly than that in the first embodiment.

According to the invention, since the pushing portion of the front side link means is brought into abutment with the portion for abutment of the rear side link means so as to push the rear sunshade when the front sunshade is moved rearward, there is provided no chance for the front sunshade and the rear sunshade to be brought into a direct abutment with each other so as be rubbed with each other, thereby making it possible to prevent the skin materials of the sunshades from being rubbed with each other to be damaged. In addition, since the vertical width of the pushing portion and the portion for abutment is made larger, the occurrence of a vertical disengagement of the front sunshade and the rear sunshade can be prevented without increasing the thickness of the front and rear sunshades, whereby a malfunction of the sunshades can be prevented from occurring during sunshade opening and/or closing operation, thereby making it possible to attain a smooth operation of the sunshades.

Further, according to the invention, is it possible not only to bring the pulling-in projection into a secure engagement with the portion for engagement but also to prevent the looseness of the rear sunshade in vertical directions by pressing down the front end portion of the rear sunshade by virtue of the downward biasing force of the hook member.

Still further, the front sunshade and the rear sunshade can be constructed simpler, thereby making it possible to reduce the production costs. Moreover, since the pushing portion formed integrally with the hook member is oriented toward the moving direction of the rear sunshade all the time, no force is constructed to be applied to the rear sunshade other than that applied thereto in the moving direction of the rear sunshade, a smooth operation being thereby attained.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A vehicle sunshade device comprising:

a front sunshade and a rear sunshade arranged one after the other in a longitudinal direction for opening and closing an opening formed in a roof of a vehicle, said front and rear sunshades being guided by rail mechanisms between a fully closed position where said front and rear sunshades are arranged to align with each other in a longitudinal direction to thereby close said opening and a fully closed position where said front and rear sunshades are positioned below and rearward of said opening with said front sunshade being stacked above said rear sunshade; and a link mechanism provided at a rear end of said front sunshade and a front end of said rear sunshade for pushing the front end of said rear sunshade until said rear sunshade reaches said fully opened position when said front sunshade is moved rearward and for pulling out the front end of said rear sunshade until said rear sunshade reaches said fully closed position when said front sunshade is moved forward, said link mechanism comprising:

rear side link means comprising:

a pushing projection provided on an upper surface of a front end portion of a rear sunshade so as to protrude therefrom and having a portion for abutment at a front end thereof; and a pulling-out projection provided on the upper surface of said front end portion of said rear sunshade so as to protrude therefrom and having a portion for engagement at a rear portion thereof; and front side link comprising:
- a pushing portion provided at the rear end of said front sunshade and adapted to be brought into abutment with said portion for abutment of said pushing projection so as to push said front end portion of said rear sunshade rearward when said front sunshade is moved rearward; and
- a hook member provided having at a rear end thereof a hook portion oriented downwardly and adapted to be brought into engagement with said portion for abutment of said pulling-out projection so as to pull out said front end portion of said rear sunshade forwardly when said front sunshade is moved forwardly.

2. A vehicle sunshade device according to claim 1, wherein said front side link comprises a supporting piece secured to the rear end of said front sunshade, and said hook member is pivotally secured to said supporting piece with a shaft oriented transversely and is biased so as to be oriented downwardly.

3. A vehicle sunshade device according to claim 2, wherein said pushing portion is made integral with said hook member, and a line connecting a point of contact between said pushing portion and said portion of abutment and a rotating center of said hook member is constructed so as to be partially oriented in the same direction as that in which said rear sunshade is moved.

* * * * *